US006356315B1

(12) United States Patent
Chen et al.

(10) Patent No.: US 6,356,315 B1
(45) Date of Patent: Mar. 12, 2002

(54) SAMPLING RATE CONVERSION USING DIGITAL DIFFERENTIAL ANALYZERS

(75) Inventors: Chih-Kang Chen, San Jose; Anil Sawe, Saratoga; David Tran, San Jose, all of CA (US)

(73) Assignee: Oak Technology, Inc., Sunnyvale, CA (US)

( * ) Notice: Subject to any disclaimer, the term of this patent is extended or adjusted under 35 U.S.C. 154(b) by 0 days.

(21) Appl. No.: 09/165,036

(22) Filed: Oct. 1, 1998

Related U.S. Application Data

(62) Division of application No. 08/695,795, filed on Aug. 12, 1996, now Pat. No. 5,835,160.
(60) Provisional application No. 60/020,455, filed on Sep. 13, 1995.

(51) Int. Cl.[7] ................................................. H04N 7/16
(52) U.S. Cl. ................ 348/581; 348/704; 348/440.1; 348/561; 348/441; 382/298
(58) Field of Search ............................. 348/581, 582, 348/561, 565, 704, 450, 453, 440.1, 441, 240; 382/298, 299, 300; 358/445, 448; 708/102, 313; H04N 7/01

(56) References Cited

U.S. PATENT DOCUMENTS

| | | | |
|---|---|---|---|
| 3,818,475 A | 6/1974 | Hussey | 340/324 A |
| 3,867,701 A | 2/1975 | Karmel et al. | 328/134 |
| 4,323,978 A | 4/1982 | Hoefert | 364/702 |
| 4,870,661 A | 9/1989 | Yamada et al. | 375/122 |
| 5,119,093 A | 6/1992 | Vogt et al. | 341/123 |
| 5,212,659 A | 5/1993 | Scott et al. | 364/724.1 |
| 5,243,433 A | 9/1993 | Hailey | 358/214 |
| 5,274,469 A | 12/1993 | Small et al. | 358/445 |
| 5,283,651 A | 2/1994 | Ishizuka | 348/704 |
| 5,303,321 A | 4/1994 | Peaslee et al. | 395/143 |
| 5,305,432 A | 4/1994 | Kubota | 395/143 |
| 5,331,346 A | 7/1994 | Shields et al. | 348/441 |
| 5,353,067 A | * 10/1994 | Kaji | 348/568 |
| 5,481,315 A | 1/1996 | Matsunaga | 348/565 |
| 5,517,239 A | * 5/1996 | Nakayama | 348/222 |
| 5,574,572 A | * 11/1996 | Malinowski et al. | 358/451 |

OTHER PUBLICATIONS

U.S. application no. 08/695,795, Chen et al., filed Aug. 12, 1996.
K. Blair Benson, "Television Engineering Handbook," McGraw–Hill Book Company, pp. 4.66–4.68 and 5.29–5.33 (1985).
J. Foley et al., "Computer Graphics, Principles and Practice, Basic Raster Graphics Algorithms for Drawing 2D Primitives," Second Edition–Addison–Wesley Publishing Co., pp. 72–74.

* cited by examiner

Primary Examiner—Reinhard J. Eisenzopf
Assistant Examiner—Jean W. Désir
(74) Attorney, Agent, or Firm—Townsend and Townsend and Crew LLP

(57) ABSTRACT

Magnification/reduction is achieved by a single FIR filter under the control of a Digital Differential Analyzer (DDA) as would be used to simulate a perfectly straight line on a two-dimensional raster. The single FIR filter combines the processes of interpolation, filter, and decimation. The DDA is programmed with the desired magnification/reduction ratio and provides signals that control shifting of input samples into the FIR filter and selection of FIR coefficients for the FIR filter.

13 Claims, 5 Drawing Sheets

SAMPLING RATE CONVERSION USING DIGITAL DIFFERENTIAL ANALYZERS

CROSS-REFERENCE TO RELATED APPLICATIONS

This applications is a division of U.S. application Ser. No. 08/695,795, filed Aug. 12, 1996, now U.S. Pat. No. 5,835,160, and also claims priority from U.S. Provisional Application Ser. No. 60/020,455, filed Sep. 13, 1995.

BACKGROUND OF THE INVENTION

The present invention relates generally to a system for sampling rate conversion and particularly to a system that resamples by way of interpolation, filtering, and decimation.

During display of a video image sequence, it is often desirable to magnify or reduce an original video frame size or viewing area size on screen. For example, in multimedia systems it is desirable to allow users to change the size of multiple video images from time to time. Magnification and reduction capabilities also find application in picture-in-picture features in consumer televisions.

Often, original video images to be reduced or enlarged are available in digital form, having been received from television or direct satellite broadcast, decoded from MPEG (Moving Picture Expert Group) and JPEG (Joint Photographic Expert Group) standards coded bitstream, or downloaded from CD ROMs. One way to achieve magnification or reduction of digitized video images is to use the techniques of interpolation, linear filtering and decimation of image.

A video system capable of displaying digital video images typically displays a fixed number of pixels per scan line and a fixed number of scan lines per image. The spacing between pixels on a scan line is also fixed. To magnify (or reduce) an image for display is equivalent to increasing (or decreasing) the number of pixels or samples that represent the image so that an increased (or decreased) display area is obtained on the video monitor. Thus magnification or reduction can be implemented as a sampling rate conversion process applied to each video scan line. A general mathematical scheme of sampling rate conversion is disclosed in Ronald E. Crochiere and Lawrence R. Rabiner, "Multirate Digital Signal Processing," Prentice-Hall, 1983, the contents of which are herein expressly incorporated by reference for all purposes.

To realize such a sampling rate conversion scheme, the necessary interpolation and decimation factors must first be determined. For an input signal x(n) with sampling period $T_{in}$ (or sampling frequency $F_{in}$) and a resampled output signal y(n) with sampling period $T_{out}$ (or sampling frequency $F_{out}$), the following ratio is formulated, $$\frac{T_{in}}{T_{out}} = \frac{F_{out}}{F_{in}} = \frac{L}{M}$$

where L and M are integers and are referred to as the interpolation factor and decimation factor, respectively. For L>M, the output signal y(n) achieves an increased sampling rate and hence an increased number of samples or pixels per scan line. The visible effect is a magnified video image when displayed because more pixels occupy more physical space on screen. For L<M, the opposite effect is obtained.

To implement magnification/reduction in this way, three functional blocks are typically used: an interpolator, a low-pass filter, and finally a decimator. The interpolator first places L−1 zero-valued samples between successive samples in x(n). This operation increases the sampling rate of the signal x(n) by a factor of L and creates L−1 folds of spectral images in the frequency domain of the interpolated signal. The low-pass filter is then employed to filter out these spectral images while retaining the component at the baseband. Finally, the filtered signal is decimated with a factor of M, that is, the decimator outputs every M-th sample to form the output signal y(m). Mathematically, the sampling rate conversion process is expressed as $$y(m) = \sum_{n=-\infty}^{\infty} h(Mm - nL) \times (n) \quad (2)$$

where {h(n)} represents the low-pass filter.

However, a magnification/reduction system that incorporates a distinct interpolator, low-pass filter, and decimator is complex and costly to implement, requiring extensive VLSI surface area. A P-tap FIR implementation of the low-pass filter, necessarily operates at L times the input sample rate and thus requires L*P operations per input sample. What is needed is a more efficient magnification/reduction scheme suitable for VLSI implementation.

SUMMARY OF THE INVENTION

In accordance with the invention, magnification/ reduction is achieved by a single FIR filter under the control of a Digital Differential Analyzer (DDA) as would be used to simulate a perfectly straight slope line on a two-dimensional raster. The single FIR filter combines the processes of interpolation, filtering, and decimation. The DDA is programmed with the desired magnification/reduction ratio and provides signals that control shifting of input samples into the FIR filter and selection of FIR coefficients for the FIR filter. In one embodiment, a prefilter and decimator are provided for optionally preprocessing the input so that an overall reduction in computation is provided by magnification within the FIR filter itself.

In one embodiment suitable for use with color digital video systems, a first FIR filter controlled by a first DDA applies magnification/reduction to a luminance signal, Y, and a second FIR controlled by a second DDA applies magnification/reduction to an interleaved combination of two chrominance signals, $C_b$ and $C_r$. The two chrominance signals are processed separately within the second FIR.

In accordance with one aspect of the invention, a DDA adapted for use in magnification/reduction includes a ratio register, an adder, and a status register. A magnification reduction ratio M/L is stored in the ratio register with L being restricted to being a power of two. This ratio is summed by the adder into the status register after every calculation of an output sample by the FIR filter. The status register thus tracks the output sample position as compared to the input sample position. The necessary width of these registers depends on the expected cumulative error across a single scan line, since the DDA is typically reset upon completion of a particular scan line.

In one particular embodiment, the status register has twelve bits [11] through [0] with [11] being the most significant bit and [0] being the least significant bit with a decimal point implied between bits [10 ] and [9]. For an interpolation factor, L=4, bits [9–8] are used to select from among four sets of FIR coefficients for the FIR filter for each calculation of an output sample. For other values of L which are powers of two, $\log_2 L$ bits beginning with bit [9] would be used for this purpose. For magnification, a toggling of bit

[10] is the signal to shift a new sample or pixel into the FIR. For reduction, bits [11–10] indicate how many samples or pixels are to be shifted into the FIR after the calculation of each output sample. This control of the input shifting achieves the necessary interpolation by L. Decimation by M is achieved since the output sample position is incremented by the magnification/reduction ratio.

The invention will be better understood by reference to the following detailed description in connection with the accompanying drawings.

DESCRIPTION OF THE SPECIFIC EMBODIMENTS

The preferred embodiment of the sampling rate conversion system of the present invention is directed toward processing of video image signals in order to achieve an image magnification or reduction effect. Sampling rate conversion could be achieved in other contexts as well in accordance with the present invention.

Figure 1:
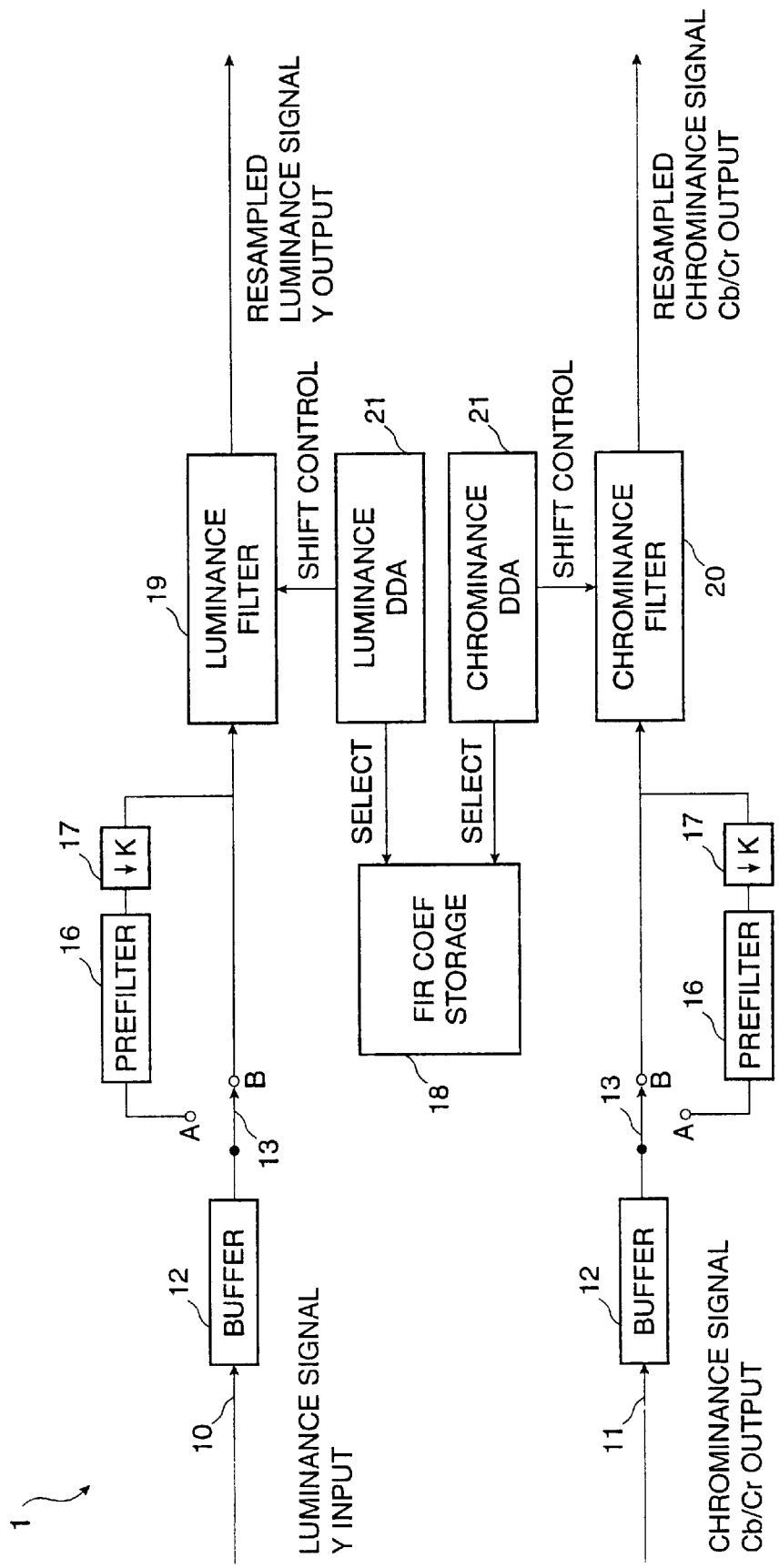
FIG. 1 is a block diagram of the sampling rate conversion system according to one embodiment of the present invention.

FIG. 1 is a block diagram of a sampling rate conversion system 1 according to one embodiment of the present invention. There are two inputs 10 and 11 to the system, one for a luminance signal component Y (or Y pixel) and one for two chrominance signal components Cb and Cr (or simply Cb pixel and Cr pixel). At the chrominance input 11, the Cb and Cr pixels are interleaved and together have a sampling rate the same as the Y pixel at the luminance input 10.

The luminance signal and interleaved chrominance signal are resampled separately. Each signal is fed through a buffer 12, a switch 13, then depending on the setting of switch 13 through a prefilter 16 and a decimator-by-K 17 or alternatively directly to luminance filter 19 or chrominance filter 20. The FIR coefficients of luminance filter 19 and chrominance filter 20 are stored in FIR coefficient storage 18. The luminance signal is resampled within luminance filter 19 under the control of a luminance DDA (Digital Differential Analyzer) 21. The chrominance signal is resampled within chrominance filter 20 under the control of a chrominance DDA 21.

Buffers 12 may be implemented using either RAMs (random-access-memory) or FIFO (first-in-first-out) memories. The switches 13 enable activation of a preprocessing stage that includes prefilter 16 and decimator-by-K 17. Prefilter 16 is an FIR low-pass filter whose coefficients are selected in accordance with factor K to eliminate spectral aliasing at the output of decimator-by-K 17 by reducing the bandwidth of the input signal by a factor of K. By including these blocks in the signal path, image reduction can be achieved even though luminance filter 19 and chrominance filter 20 operate to perform image magnification.

Luminance filter 19 and chrominance filter 20 are responsible for the operations of interpolation, FIR filtering, and decimation inherent in resampling. Luminance filter 19 operates on the Y signal and chrominance filter 20 operates on both the Cb and Cr signals. Since each of the Cb and Cr signals have an effective sample rate that is half that of the Y signal, chrominance filter 20, clocked at the same speed as luminance filter 19, alternately processes the Cb and CR sample streams in a time-multiplexed fashion.

The FIR coefficients used by the luminance and chrominance filters 19 and 20 are stored in FIR coefficient storage device 18. Storage device 18 can be implemented using RAM or similar electronic devices. As will be explained below, the FIR coefficients are grouped into sets within storage device 18 with each set being independently selectable by the luminance DDA and chrominance DDA controllers 21. The resampled luminance and chrominance signals exit from the output of filters 19 and 20 respectively.

Figure 2:
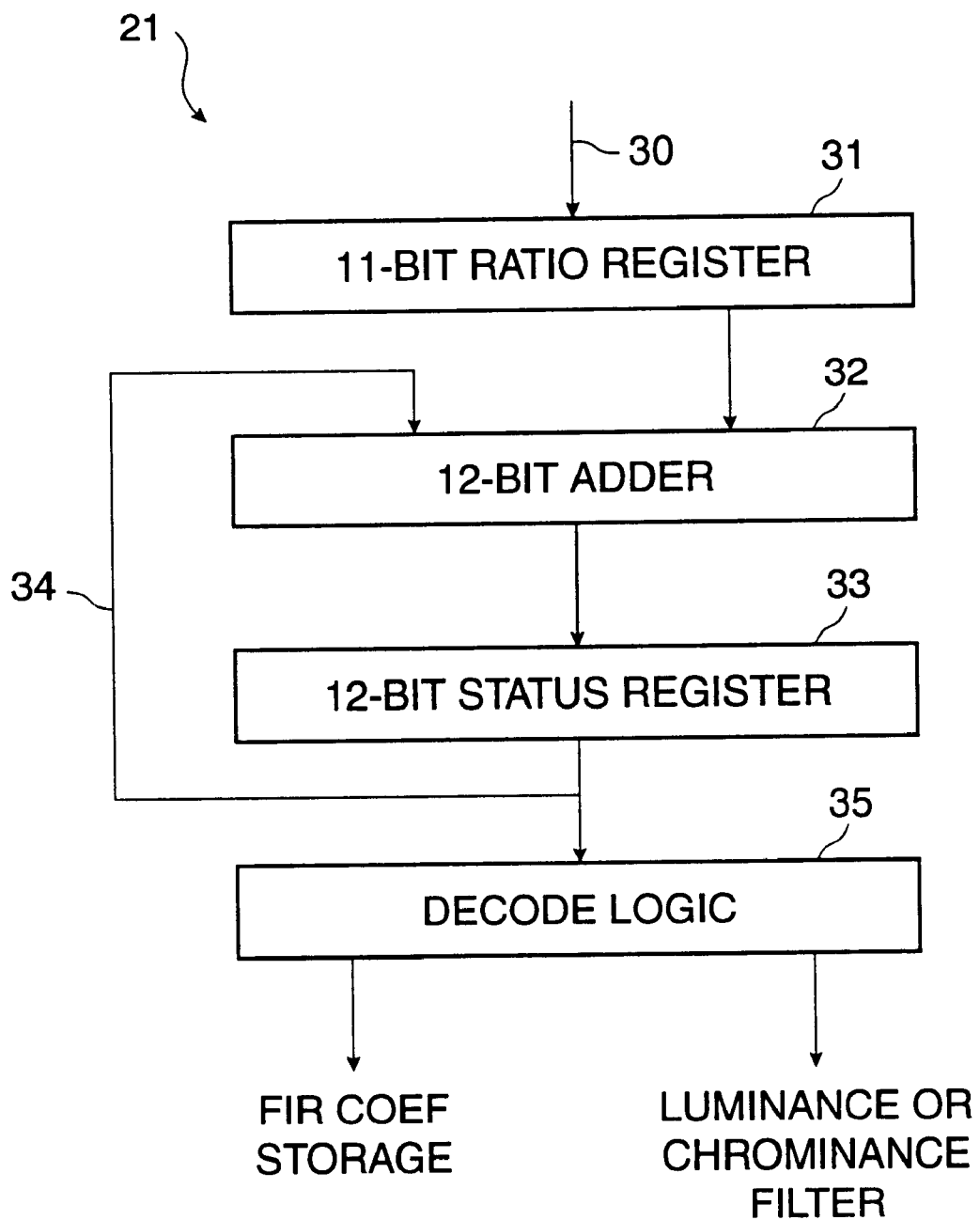
FIG. 2 is a detailed diagram of a DDA controller responsible for controlling other functional blocks in the sampling rate conversion system of FIG. 1 in accordance with one embodiment of the present invention.

The operation of DDA controllers 21 is critical to achieving the resampling operation within luminance filter 19 and chrominance filter 20. FIG. 2 is a detailed diagram of one of DDA controllers 21. An input 30 is used to program a desired magnification/reduction ratio. This ratio is stored in a ratio register 31. In the preferred embodiment, the ratio register is eleven bits wide, [10 . . . 0], where bit [10] denotes the MSB and bit [0] denotes the LSB with a decimal point being placed between bits [10] and [9].

The magnification/reduction ratio can be expressed as:

$$Ratio = \frac{T_{out}}{T_{in}} = \frac{M}{L} \tag{3}$$

This ratio is computed and rounded off to a 10-bit binary fraction plus 1-bit integer number prior to storage in ratio register 31. The following cases are possible:

Ratio<1: sampling rate increase or image magnification

Ratio=1: no change to sampling rate or image copy

Ratio>1: sampling rate decrease or image reduction

For the preferred embodiment, Ratio<2 is constrained to be less than 2 due to the configuration of ratio register 31.

The output of ratio register 31 represents a first input to a 12-bit adder 32. The output of 12-bit adder 32 is stored in a 12-bit status register 33. The output of status register 33 is an input to a decode logic unit 35 for control signal generation and at the same time it is connected to the other input of the 12-bit adder 32 through a feedback path 34. Decode logic unit 35 decodes the bit information from the status register 33 to generate two signals. One signal selects a particular group of FIR coefficients for retrieval to the filter controlled by the DDA. The other signal controls shifting of pixels into the filter.

Both the 12-bit adder 32 and 12-bit status register 33 have bit fields labeled [11 . . . 0] with bits being aligned for "add" operation by 12-bit adder 32. A decimal point is implied between bit [10] and bit [9] for adder 32 and status register 33.

The width of registers 31 and 33 and adder 32 is chosen so that rounding error accumulated in status register 33 does not effect resampling operation. In the preferred embodiment, status register 33 is cleared after every scan line, thus limiting accumulation of error. With a maximum of 720 pixels per input scan line and a maximum of 1,024 pixels per output scan line, the 11 bit width of ratio register 31 and 12 bit width of status register 33, which give a maximum accumulation error of $(1{,}024*2^{-11})*T_{out}$, have been be sufficient.

Figure 3:
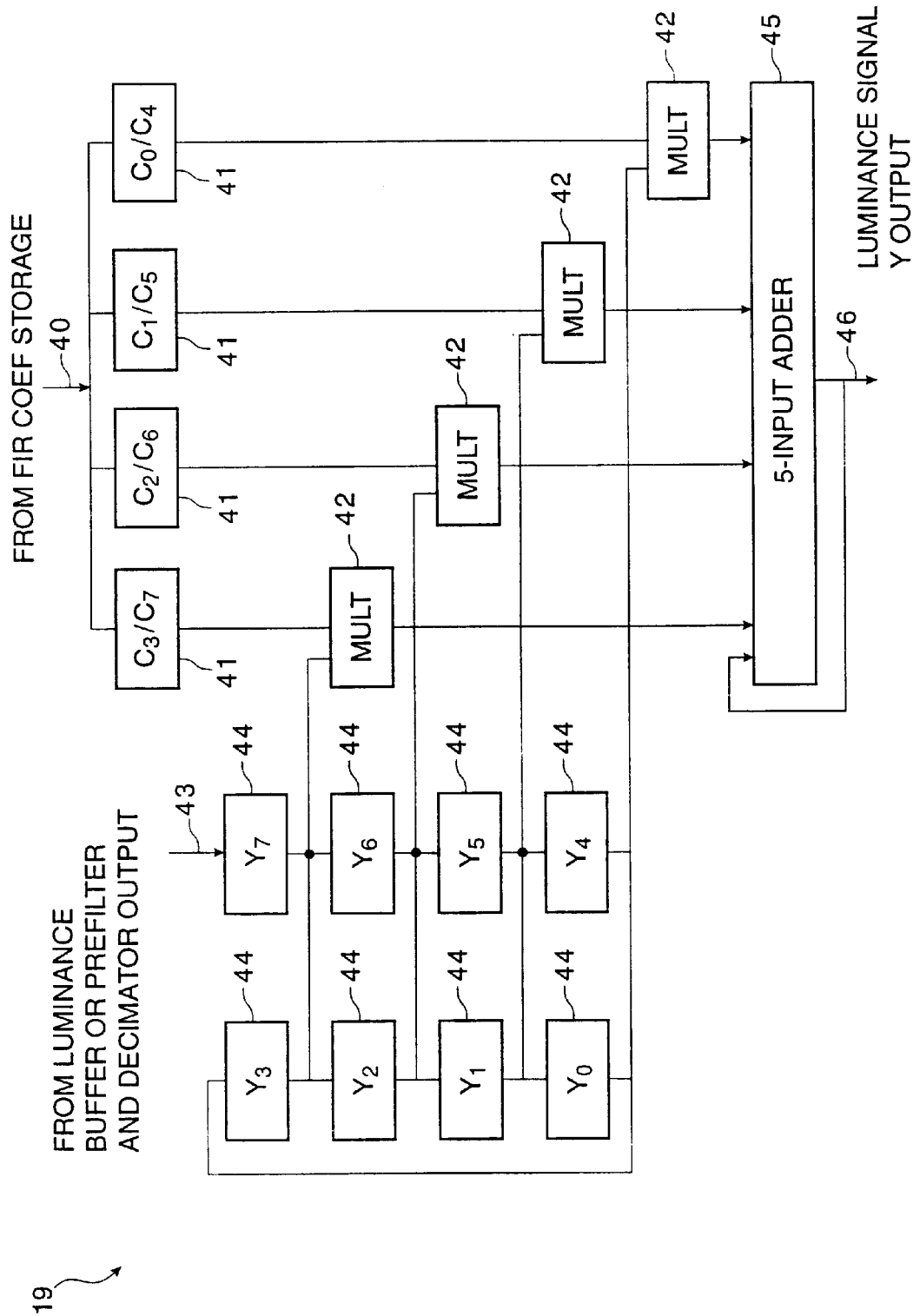
FIG. 3 is a detailed diagram of a luminance filter for resampling a luminance signal in accordance with one embodiment of the present invention.

FIG. 3 is a detailed diagram of luminance filter 19 for resampling a luminance signal in accordance with one embodiment of the present invention. Eight FIR coefficients are loaded through an input 40 to 4 pairs of coefficient registers 41, labeled C0 through C7. The particular group of FIR coefficients loaded will depend on the output of DDA controller 21. The luminance samples or pixels from buffer 12 are loaded through an input 43 to eight shift registers 44, labeled $Y_0$ through $Y_7$. The eight shift registers 44 are connected in a cascaded fashion, that is, the output of $Y_7$ is connected to the input of $Y_6$ and so on. Each shift register preferably comprises an 8-bit flip-flop. The outputs of each pair of registers 41 and the corresponding two shift registers are connected to the inputs of a multiplier 42. Thus, there are four multipliers 42. The outputs of the four multipliers are fed to a 5-input adder 45. The fifth input of the 5-input adder is fed from its own output 46. Output of 5-input adder 45 also serves as the output for the resampled luminance signal. The luminance filter completes a sum of eight multiply-and-accumulates, e.g. an 8-point convolution $$\sum_{i=0}^{7} Y_i * C_i \quad (4)$$

and send the result to output 46 at a throughput of one sample every two cycles. The loading of pixels into shift register 44 via input 43 and selection of coefficients for loading into registers 41 via input 40 is controlled by luminance DDA controller 21.

Figure 4:
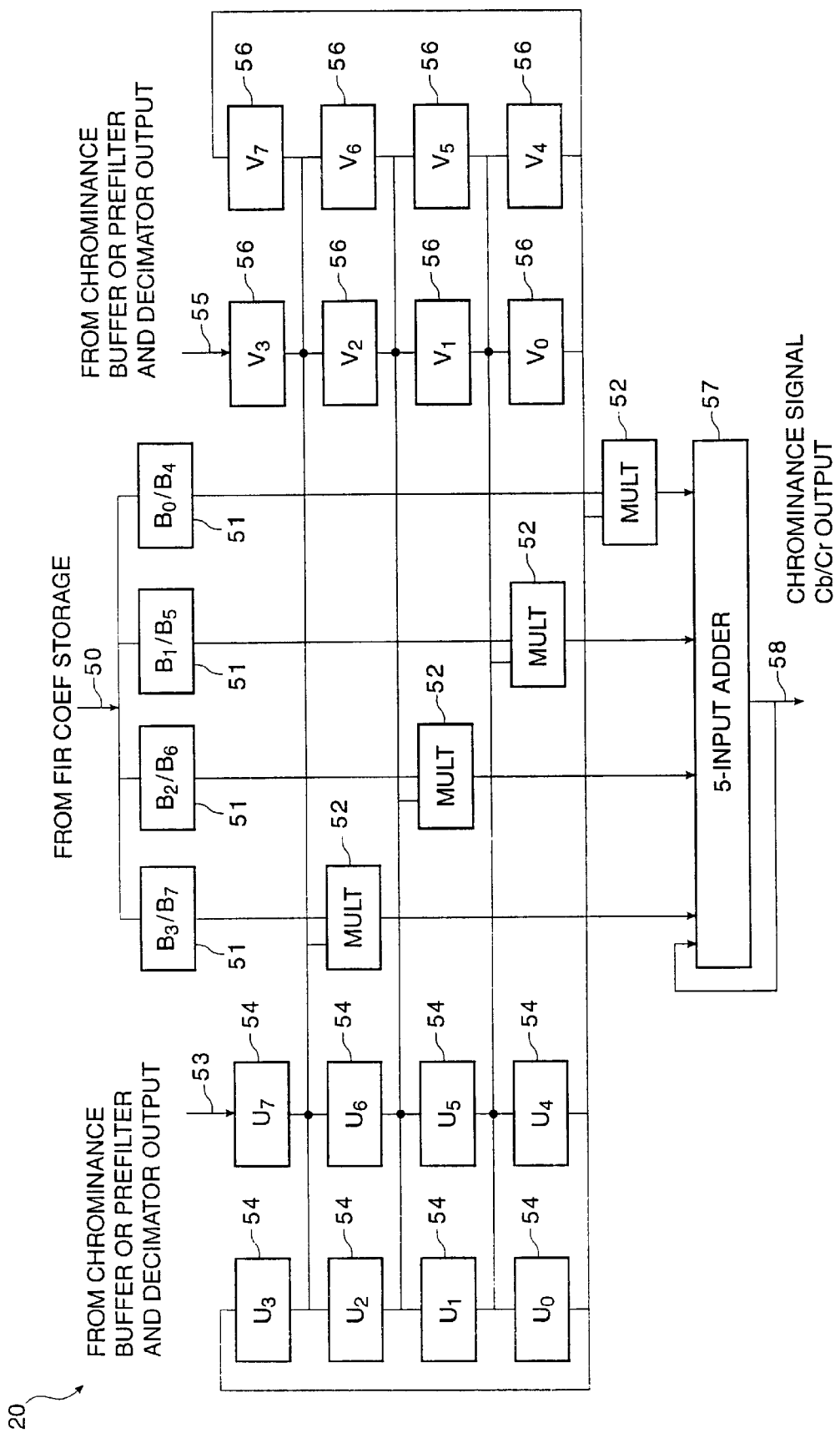
FIG. 4 is a detailed diagram of a chrominance filter for resampling chrominance signals in accordance with one embodiment of the present invention.

The internal operation of chrominance filter 20 is similar to that of luminance filter 19 except it computes separate 8-point convolutions for chrominance signals Cb and Cr. FIG. 4 is a detailed diagram of chrominance filter 20 for resampling chrominance signals in accordance with one embodiment of the present invention. Four pairs of coefficient registers 51, labeled B0 through B7, are loaded with coefficients from FIR coefficient storage 18. Unlike luminance filter 19, chrominance filter 20 contains an additional set of 8 shift registers to handle Cb and Cr separately. Chrominance Cb pixels are loaded via an input 53 to a shift register set 54, labeled $U_0$ through $U_7$ and Cr pixels are loaded from input 55 into a shift register set 56, labeled $V_0$ through $V_7$. Four multipliers 52 and a 5-input adder 57 are shared for computing the output Cb and Cr signals, that is, the two 8-point convolutions $$\sum_{i=0}^{7} U_i * B_i \quad (5)$$

for chrominance Cb signal and $$\sum_{i=0}^{7} V_i * B_i \quad (6)$$

for chrominance Cr signal. As with luminance filter 19, a throughput of two cycles is maintained for performing both convolutions. The resulting Cb and Cr output samples are computed alternately and interleaved to an output 58.

In operation, DDA controllers 21 control selection of FIR coefficients and input of pixels for luminance filter 19 and chrominance filter 20. If the distance between successive input samples or pixels on the scan line is understood to be unity, the contents of status register 33 can be understood to represent a position of the current output sample. The value of the bits to the right of the decimal point indicate the distance between the current output pixel and the input pixel immediately to the left. For the first output pixel, status register 33 contains zero, indicating the first input pixel is copied to the first output pixel. For each succeeding output pixel, status register 33 is incremented once with the contents of ratio register 31. For the case of image magnification, the contents of ratio register 31 are less than one. For the case of image reduction, the contents of ratio register 31 are greater than one but less than two.

Thus, the timing of each DDA controller is synchronized to the generation of new output pixels. After a new output pixel is generated, the number of pixels, if any to be shifted into the filter must be determined. For the case of image magnification, a toggling of the LSB to the left of the decimal point indicates that a single pixel is to be shifted in. In the preferred embodiment, this refers to bit [10].

For the case of image reduction, the bits to the left of the decimal point indicate the number of pixels to be shifted in to the filter after calculation of an output pixel. These bits to the left of the decimal point are reset before every update to the status register. In the preferred embodiment, these are bits [11 . . . 10].

The proper FIR coefficients to be applied will depend on the alignment of the output pixel to be calculated relative to the input pixels. Lowpass filtering is implicitly applied to the interpolated input stream, that is the input pixels with L-1 zeroes interspersed between each input pixel to eliminate spectral folding. However, coefficients that currently align with zeroes in this interpolated input stream are not needed and are deleted from the coefficient set for computational efficiency. The coefficients that are needed thus will vary depending on the alignment of the output sample to be calculated in relation to this interpolated input stream. Since there are L possible alignments, L coefficient sets are required.

Figure 5:
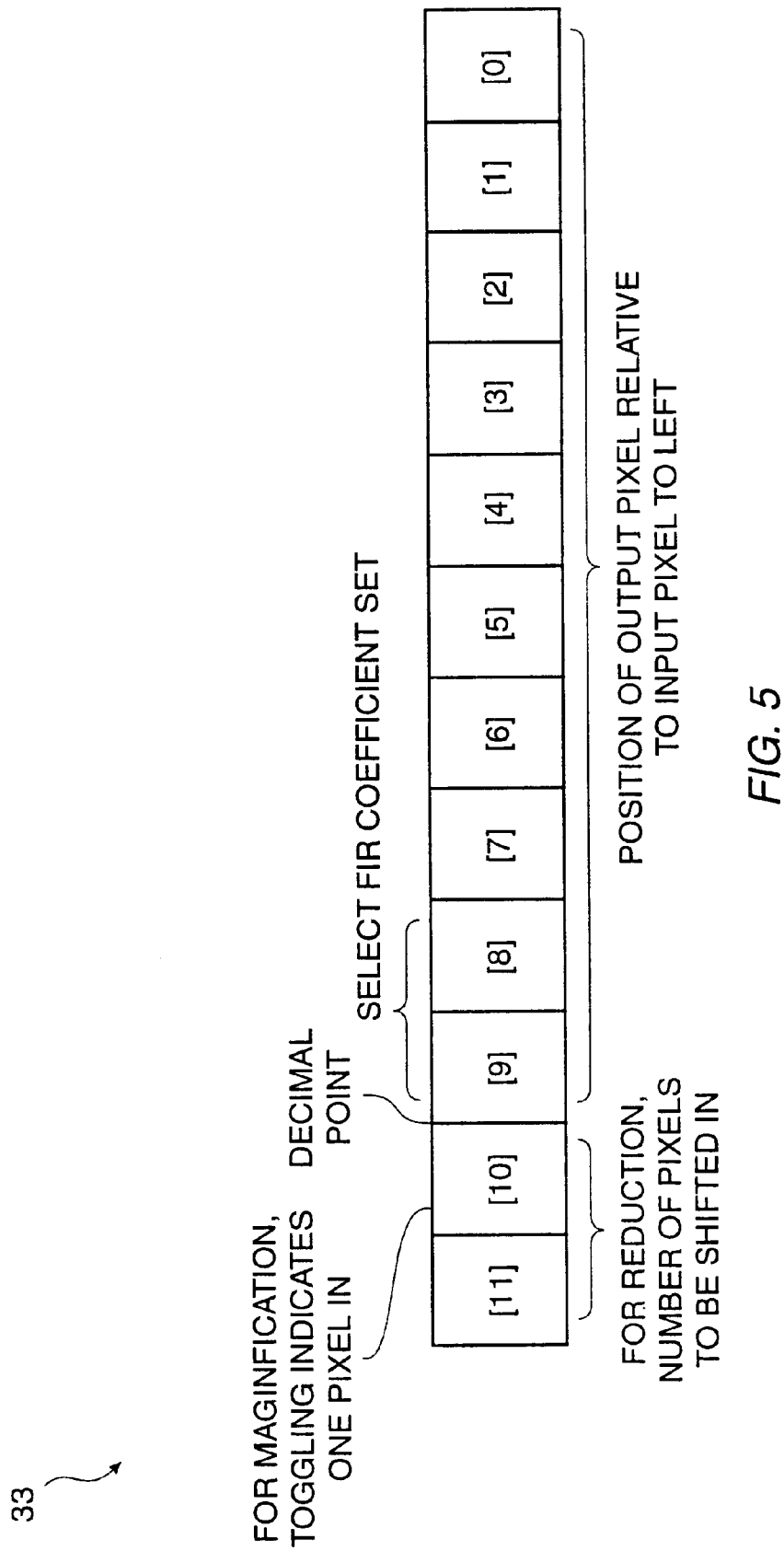
FIG. 5 is a detailed diagram of a status register within the DDA controller of FIG. 2 indicating the significance of the various bits.

The needed coefficient set is identified by the $\log_2 L$ bits to the right of the decimal point in the status register. The DDA controller addresses FIR coefficient storage 18 to provide these coefficients to the appropriate filter prior to the calculation of each output sample. In the preferred embodiment, L=4 and bits [9 . . . 8] identify the coefficient set to be selected. FIG. 5 is a detailed diagram of status register 33 indicating the significance of the various bits. The operation of the luminance DDA controller is similar to that of the chrominance DDA controller. The chrominance DDA controller runs at half speed since the input sample rates for the Cb and Cr signals are half that for the Y signal.

In an alternate mode that can be selected by use of switch 13, image reduction is processed by the luminance and chrominance filters 19 and 20 and their associated DDA controllers 21 as image magnification. In this alternate mode, prefilter 16 and decimator-by-K 17 are included in the input path for the luminance and chrominance signals. Prefilter 16 is preferably a 3-tap FIR filter and decimator 17 preferably has K=2 sending every other pixel to the luminance and chrominance filters 19 and 20. Thus, the sampling rate into the luminance and chrominance filters is reduced by a factor of 2 from the inputs 10 and 11. As the result, the overall reduction ratio becomes $$Ratio = \frac{T_{out}}{2*T_{in}} = \frac{M}{2*L} \quad (7)$$

Since the input sampling rate is thus limited to be no greater than twice the output sampling rate, Ratio for this mode of operation is less than unity. When this mode is used, the luminance and chrominance filters always perform sampling rate upconversion whether image magnification or reduction is required. The advantage of this is that the filters only need to operate in magnification mode, eliminating the need for shifting in two input pixels for one output pixel during image reduction. Prefilter 17 may be modified to have more taps in order to minimize spectral aliasing.

Thus, the present invention permits resampling within a single FIR filter without the need for a separate interpolator and decimator. Thus, needed VLSI surface area is minimized while maintaining computational efficiency.

While the above is a complete description of the preferred embodiments of the invention, various alternatives, modifications, and equivalents may be used. It should be evident that the present invention is equally applicable by making appropriate modifications to the embodiments described above. Therefore, the above description should not be taken as limiting the scope of the invention which is defined by the metes and bounds of the appended claims.

What is claimed is:

1. A sampling rate conversion system comprising:
   an FIR filter that receives a discrete signal to be resampled via a first input and FIR coefficient data via a second input and provides a filtered output;
   an electronic memory device coupled to said FIR filter that stores said FIR coefficient data; and
   a DDA controller coupled to said FIR filter and said electronic memory device that receives a desired magnification/reduction ratio, M/L, wherein L and M are integers, and that coordinates shifting of said discrete signal into said FIR filter with selection of coefficients from said electronic memory device so that said filter output achieves said desired magnification/reduction ratio, said DDA controller comprising:
   a ratio register that stores said magnification/reduction ratio and provides said ratio as an output;
   an adder that adds a first adder input to a second adder input to provide an adder output, wherein said first adder input is coupled to said output of said ratio register;
   a status register that receives said adder output as an input and provides said second adder input as an output, wherein said ratio register is summed into said status register by said adder after every calculation by said FIR filter of a sample of said filtered output; and
   a decoder circuit that receives said output of said status register as an input and provides 1) an input shift control signal to said FIR filter to control shifting of input samples into said FIR filter, and 2) a coefficient selection signal to said electronic memory device to select a group of FIR coefficients to be loaded into said FIR filter.

2. The sampling rate conversion system of claim 1 wherein a current value of said status register represents an alignment between a current output pixel and a nearest input pixel to the left.

3. The sampling rate conversion system of claim 2 wherein said coefficient selection signal selects from among L sets of coefficients stored in said electronic memory device depending on a value of $\log_2 L$ preselected bits to the right of an implied decimal point in said status register.

4. The sampling rate conversion system of claim 2 wherein for a sampling rate increase said input shift control signal operates to shift a pixel into said FIR filter when a least significant bit to the left of an implied decimal point of said status register toggles.

5. The sampling rate conversion system of claim 2 wherein for a sampling rate decrease said input shift control signal operates to shift as many pixels as are indicated by bits to the left of an implied decimal point of said status register.

6. The sampling rate conversion system of claim 3 wherein said status register has 12 bits, 0–11 with being the least significant bit, 11 being the most significant bit with an implied decimal point between bits 10 and, 9 said predetermined bits consisting of $\log_2 L$ contiguous bits with 9 being the highest of said predetermined bits.

7. A sampling rate conversion system comprising:
   an FIR filter that receives a discrete signal to be resampled via a first input and FIR coefficient data via a second input and provides a filtered output;
   an electronic memory device coupled to said FIR filter that stores said FIR coefficient data;
   a DDA controller coupled to said FIR filter and said electronic memory device that receives a desired magnification/reduction ratio, M/L, wherein L and M are integers, and that coordinates shifting of said discrete signal into said FIR filter with selection of coefficients from said electronic memory device so that said filter output achieves said desired magnification/reduction ratio;
   a decimator having an output to said input of said FIR filter; and
   a prefilter having an output coupled to an input of said decimator.

8. The sampling rate conversion system of claim 7 wherein said discrete signal comprises a luminance signal of a digital video system.

9. The sampling rate conversion system of claim 7 wherein said discrete signal comprises interleaved first and second chrominance signals of a digital video system and said FIR filter processes said first and second chrominance signals separately.

10. A sampling rate conversion system comprising:
    an FIR filter that receives a discrete signal to be resampled via a first input and FIR coefficient data via a second input and provides a filtered output;
    an electronic memory device coupled to said FIR filter that stores said FIR coefficient data; and
    shifting means, coupled to both said FIR filter and said electronic memory device, for shifting of said discrete signal into said FIR filter with selection of coefficients from said electronic memory device so as to achieve a desired magnification/reduction ratio, M/L, wherein L and M are integers, said shifting means including a ratio register that stores said magnification/reduction ratio and provides said ratio as an output; an adder that adds a first adder input to a second adder input to provide an adder output, wherein said first adder input is coupled to said output of said ratio register; a status register that receives said adder output as an input and provides said second adder input as an output, wherein said ratio register is summed into said status register by said adder after every calculation by said FIR filter of a sample of said filtered output; and a decoder circuit that receives said output of said status register as an input and provides 1) an input shift control signal to said FIR filter to control shifting of input samples into said FIR filter, and 2) a coefficient selection signal to said electronic memory device to select a group of FIR coefficients to be loaded into said FIR filter, wherein a current value of said status register represents an alignment between a current output pixel and a nearest input pixel to the left.

11. The sampling rate conversion system of claim 10 wherein said status register has 12 bits, 0–11 with 0 being the least significant bit, 11 being the most significant bit with an implied decimal point between bits 10 and 9, said predetermined bits consisting of $\log_2 L$ contiguous bits with 9 being the highest of said predetermined bits.

12. The sampling rate conversion system of claim 11 further comprising a decimator having an output coupled to said input of said FIR filter; and a prefilter having an output coupled to an input of said decimator.

13. The sampling rate conversion system of claim 12 wherein said discrete signal comprises a luminance signal of a digital video system.

* * * * *